(12) United States Patent
Kim et al.

(10) Patent No.: US 9,612,392 B2
(45) Date of Patent: Apr. 4, 2017

(54) DISPLAY DEVICE

(71) Applicant: Samsung Display Co., Ltd., Yongin, Gyeonggi-Do (KR)

(72) Inventors: Joo Young Kim, Suwon-si (KR); Hyoung Joo Kim, Anyang-si (KR); Dong Yeon Kang, Seoul (KR); Chang Moo Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 273 days.

(21) Appl. No.: 14/260,871

(22) Filed: Apr. 24, 2014

(65) Prior Publication Data

US 2015/0219835 A1 Aug. 6, 2015

(30) Foreign Application Priority Data

Feb. 6, 2014 (KR) ........................ 10-2014-0013692

(51) Int. Cl.
*F21V 8/00* (2006.01)
*G02F 1/1333* (2006.01)

(52) U.S. Cl.
CPC ..... *G02B 6/0086* (2013.01); *G02F 1/133308* (2013.01); *G02B 6/0031* (2013.01); *G02F 2001/133317* (2013.01)

(58) Field of Classification Search
CPC ................ G02B 6/0086; G02B 6/0031; G02F 1/133308; G02F 2001/133317
See application file for complete search history.

(56) References Cited

U.S. PATENT DOCUMENTS

| | | | | |
|---|---|---|---|---|
| 8,441,596 B2* | 5/2013 | Shiraishi | ............ | G02B 6/0031 349/62 |
| 2008/0088765 A1* | 4/2008 | Hashimoto | ........... | G02F 1/1333 349/58 |
| 2010/0245703 A1* | 9/2010 | Lin | ....................... | G02B 6/0083 349/58 |

(Continued)

FOREIGN PATENT DOCUMENTS

| JP | 2005-099619 A | 4/2005 |
|---|---|---|
| JP | 2005-321586 A | 11/2005 |

(Continued)

*Primary Examiner* — Mary Ellen Bowman
(74) *Attorney, Agent, or Firm* — Innovation Counsel LLP (57) ABSTRACT

A display device is provided. The display device includes: a display panel; a light source assembly; a light guide plate (LGP); a mold frame; and a bottom chassis. The light source assembly includes a light source configured to generate light and a circuit board on which the light source is mounted. The LGP includes an incident surface upon which the light generated by the light source is incident and an exit surface configured to output the light incident through the incident surface toward the display panel. The mold frame includes a sidewall and a protrusion which protrudes inward from the sidewall. The bottom chassis includes a bottom portion and a sidewall portion and houses the mold frame, the LGP and the light source assembly. The display panel is placed on an upper surface of the protrusion, at least a portion of the circuit board is disposed between a lower surface of the protrusion and the bottom portion, and an upper surface of the light source does not overlap the protrusion.

20 Claims, 9 Drawing Sheets

(56) References Cited

U.S. PATENT DOCUMENTS

2011/0141397 A1* 6/2011 Lee ..................... G02B 6/0083
                                                               349/64

FOREIGN PATENT DOCUMENTS

| | | |
|---|---|---|
| JP | 2007-292901 A | 11/2007 |
| JP | 2009-244499 A | 10/2009 |
| KR | 10-2008-0010165 A | 1/2008 |
| KR | 10-2008-0070277 A | 7/2008 |
| KR | 10-2009-0060707 A | 6/2009 |
| KR | 10-2011-0048299 A | 5/2011 |
| KR | 10-2011-0048300 A | 5/2011 |
| KR | 10-2011-0048301 A | 5/2011 |
| KR | 10-2012-0067612 A | 6/2012 |
| KR | 10-2012-0078234 A | 7/2012 |
| KR | 10-2012-0116290 A | 10/2012 |
| KR | 10-2013-0095085 A | 8/2013 |
| WO | WO 2010004794 A1 * | 1/2010 ........... G02B 6/0085 |

\* cited by examiner

DISPLAY DEVICE

This application claims priority from Korean Patent Application No. 10-2014-0013692 filed on Feb. 6, 2014 in the Korean Intellectual Property Office, the disclosure of which is incorporated herein by reference in its entirety.

BACKGROUND

1. Field

The present application relates to a display device.

2. Description of the Related Art

Generally, a display device for displaying an image includes a display panel and a backlight assembly which provides light to the display panel. The backlight assembly is classified as an edge-illumination type backlight assembly or a direct-illumination type backlight assembly according to the position of a light source. The edge-illumination type backlight assembly requires a light guide plate (LGP) so as to guide light emitted from the light source toward the display panel.

The LGP included in the edge-illumination type assembly includes an exit surface which outputs light, a reflective surface which faces the exit surface, and side surfaces which are perpendicular to the reflective surface and connect the reflective surface and the exit surface. The light source is placed adjacent to at least one of the side surfaces of the LGP so as to provide light to the LGP.

With the trend toward lighter, thinner, and more compact display devices, a display device having a light source fixed to a rear surface of a display panel to reduce its thickness has been suggested. However, when this display device is bent or deformed by an external factor or its own weight, the position of the light source is changed. Accordingly, this undermines the reliability of the display device.

SUMMARY

Aspects of the inventive concept provide a display device having improved reliability and reduced size or thickness.

However, aspects of the inventive concept are not restricted to the ones set forth herein. The above and other aspects of the inventive concept will become more apparent to one of ordinary skill in the art to which the inventive concept pertains by referencing the detailed description given below.

According to one embodiment, there is provided a display device. The display device comprises: a display panel, a light source assembly, a light guide plate (LGP), a mold frame, and a bottom chassis. The light source assembly comprises a light source configured to generate light and a circuit board on which the light source is mounted. The LGP comprises an incident surface upon which the light generated by the light source is incident and an exit surface configured to output the light incident through the incident surface toward the display panel. The mold frame comprises a sidewall and a protrusion which protrudes inward from the sidewall. The bottom chassis comprises a bottom portion and a sidewall portion and houses the mold frame, the LGP and the light source assembly. The display panel is placed on an upper surface of the protrusion, at least a portion of the circuit board is disposed between a lower surface of the protrusion and the bottom portion, and an upper surface of the light source does not overlap the protrusion.

According to another embodiment, there is provided a display device. The display device comprises: a display panel, a light source assembly, a light guide plate (LGP), a mold frame, a bottom chassis, and a light-blocking member. The light source assembly comprises a light source configured to generate light and a circuit board on which the light source is mounted. The LGP comprises an incident surface upon which the light generated by the light source is incident and an exit surface configured to output the light incident through the incident surface toward the display panel. The display panel is placed on the mold frame, which fixes the circuit board in place. The bottom chassis comprises a bottom portion and a sidewall portion and houses the mold frame, the LGP and the light source assembly. The light-blocking member covers an upper surface of the light source and a portion of an upper surface of the LGP which is continuous with the incident surface. The bottom portion comprises a step portion which is located under the LGP and overlapped by the light-blocking member.

BRIEF DESCRIPTION OF THE DRAWINGS

The above and other aspects and features of the inventive concept will become more apparent by describing in detail exemplary embodiments thereof with reference to the attached drawings, in which.

DETAILED DESCRIPTION

Advantages and features of the inventive concept and methods of accomplishing the same may be understood more readily by reference to the following detailed description of exemplary embodiments and the accompanying drawings. The inventive concept may, however, be embodied in many different forms and should not be construed as being limited to the exemplary embodiments set forth herein. Rather, these exemplary embodiments are provided so that this disclosure will be thorough and complete and will fully convey the concept of the inventive concept to those skilled in the art, and the inventive concept will only be defined by the appended claims. Like numbers refer to like elements throughout. In the drawings, sizes and relative sizes of layers and regions may be exaggerated for clarity.

It will be understood that when an element or layer is referred to as being "on" another element or layer, it can be directly on the other element or layer or intervening elements or layers may be present.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Like reference numerals refer to like elements throughout the specification.

Embodiments are described herein with reference to plan and cross-section illustrations that are schematic illustrations of idealized embodiments. As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing. Thus, the regions illustrated in the figures are schematic in nature and their shapes are not intended to illustrate the actual shape of a region of a device and are not intended to limit the scope of the inventive concept.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the inventive concept.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term, "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments will be described with reference to the attached drawings.

Figure 1:
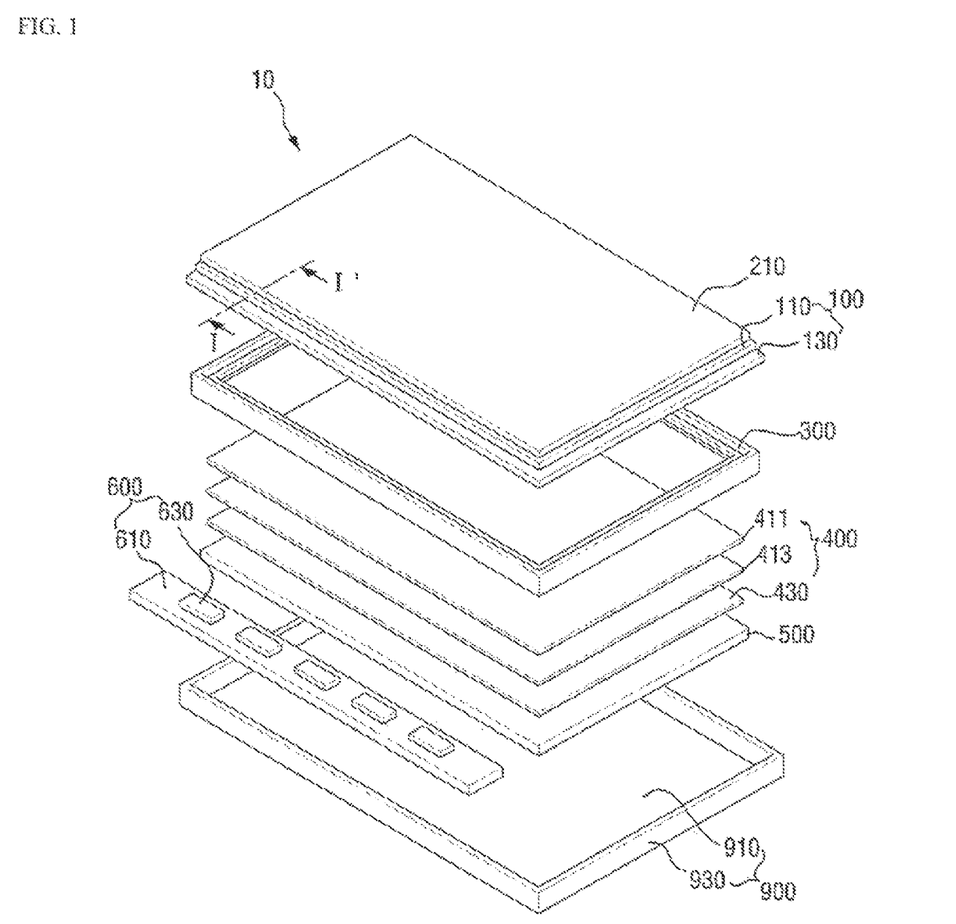
FIG. 1 is a schematic exploded perspective view of a display device according to an embodiment.
Figure 2:
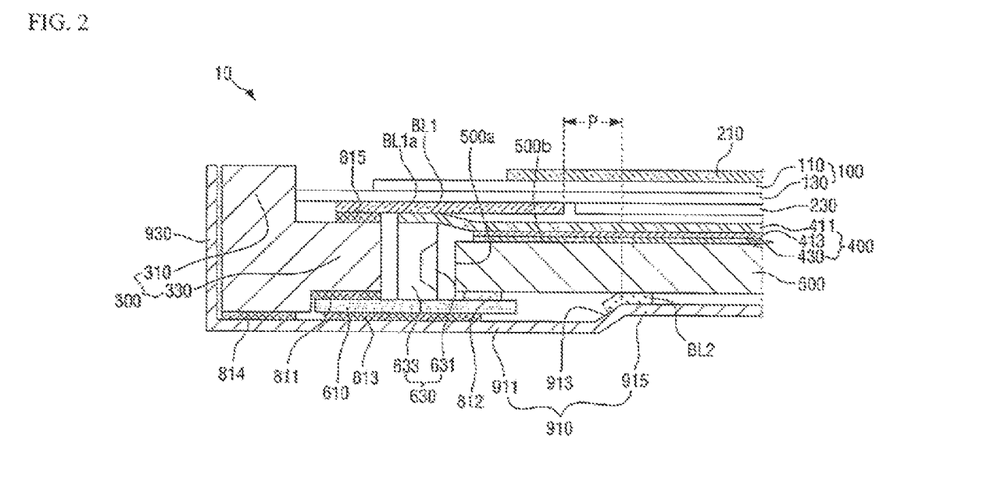
FIG. 2 is a cross-sectional view of the display device taken along the line I-I' of FIG. 1.
Figure 3:
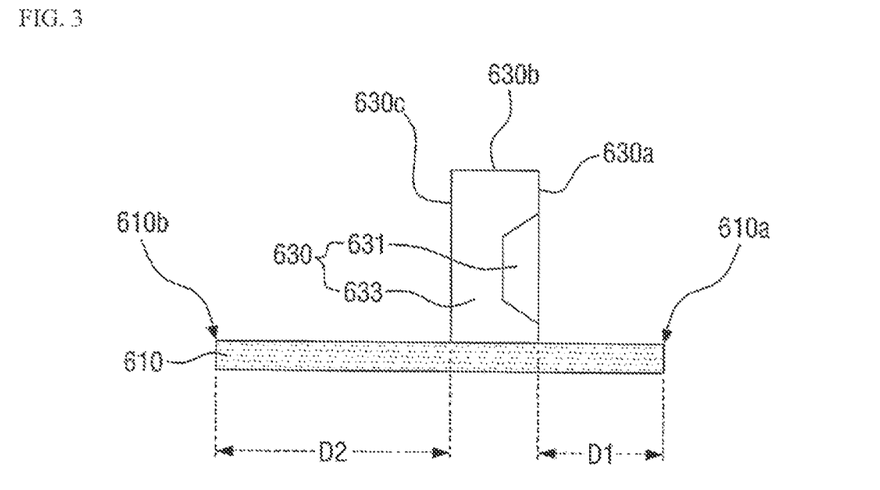
FIGS. 3 and 4 are cross-sectional views of a light source assembly of the display device of FIG. 1.
Figure 4:
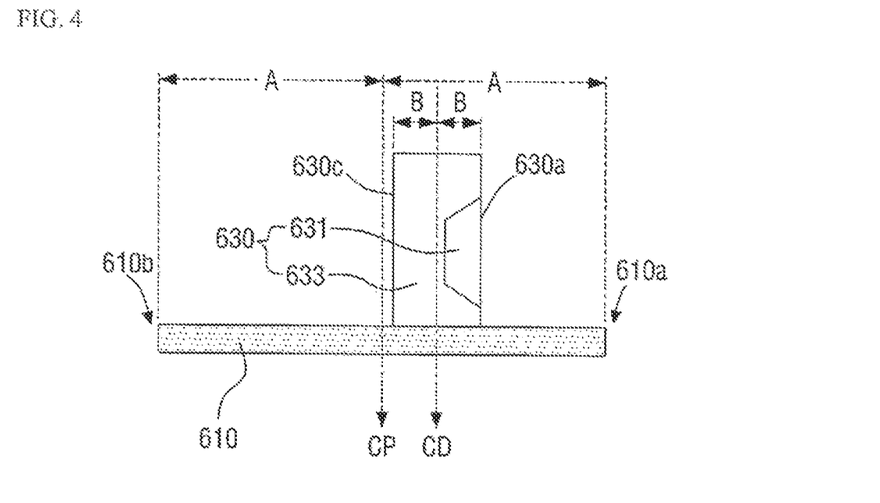
Figure 5:
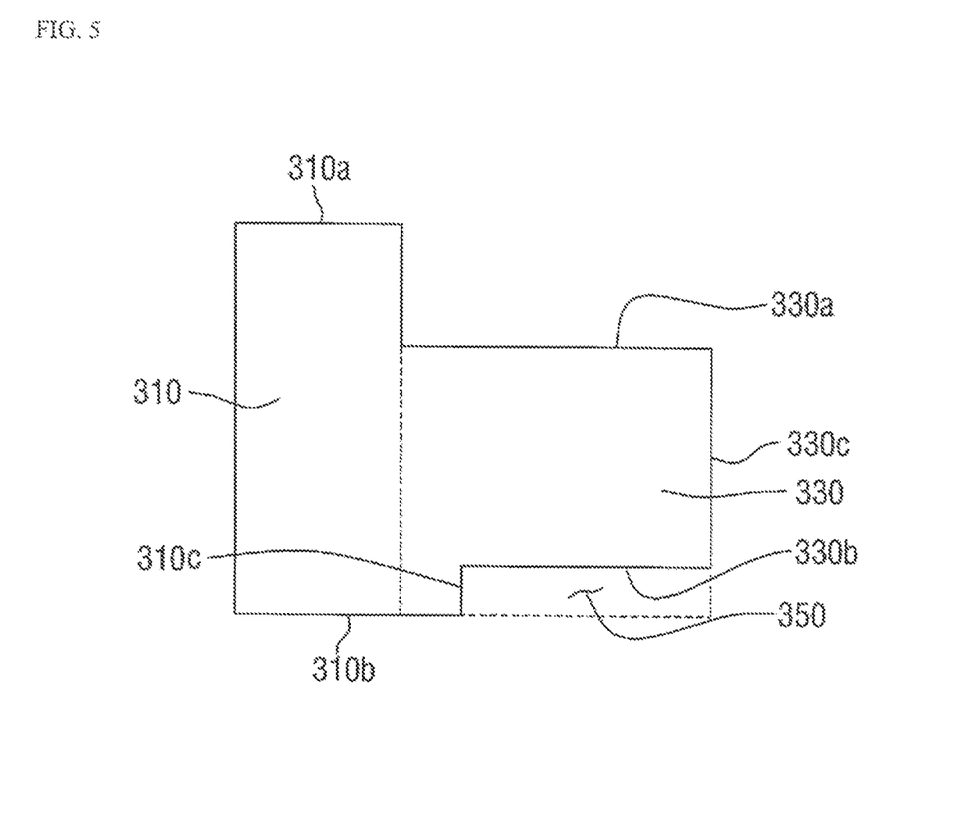
FIG. 5 is a cross-sectional view of a mold frame of the display device of FIG. 1.
Figure 6:
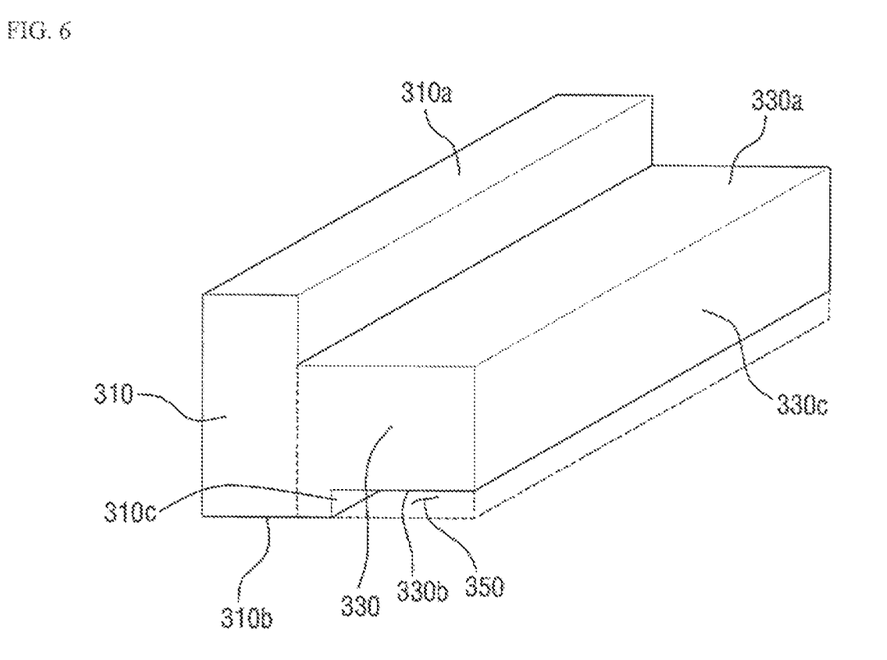
FIG. 6 is a perspective of the mold frame of the display device of FIG. 1.
Figure 7:
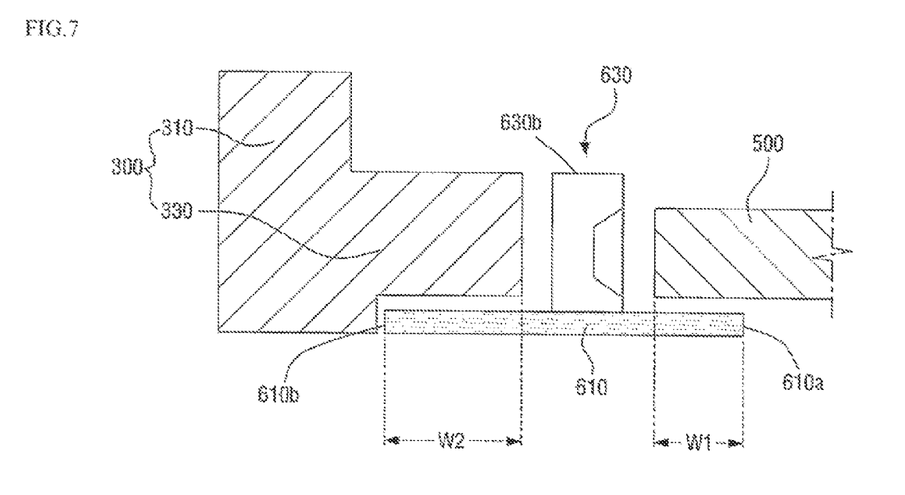
FIG. 7 is a cross-sectional view illustrating the relationship among the light source assembly, the mold frame, and a light guide plate (LGP) in the display device of FIG. 1.
Figure 8:
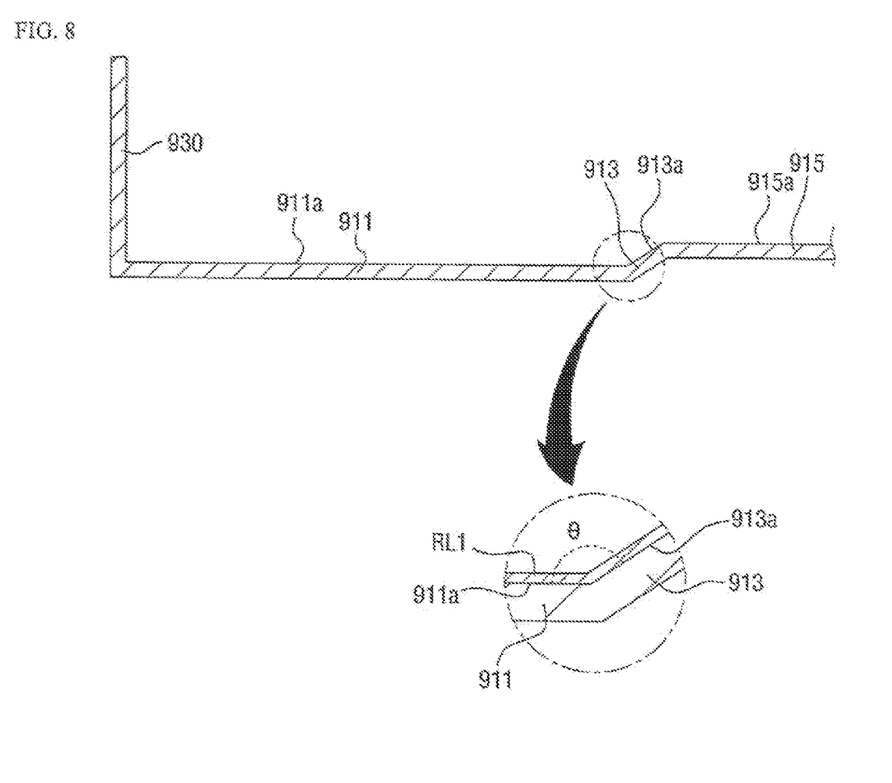
FIG. 8 is a cross-sectional view of a bottom chassis of the display device of FIG. 1.

FIG. 1 is a schematic exploded perspective view of a display device 10 according to an embodiment. FIG. 2 is a cross-sectional view of the display device 10 taken along the line I-I' of FIG. 1. FIGS. 3 and 4 are cross-sectional views of a light source assembly 600 of the display device 10 of FIG. 1. FIG. 5 is a cross-sectional view of a mold frame 300 of the display device 10 of FIG. 1. FIG. 6 is a perspective of the mold frame 300 of the display device 10 of FIG. 1. FIG. 7 is a cross-sectional view illustrating the relationship among the light source assembly 600, the mold frame 300, and a light guide plate (LGP) 500 in the display device 10 of FIG. 1. FIG. 8 is a cross-sectional view of a bottom chassis 900 of the display device 10 of FIG. 1.

Referring to FIGS. 1 through 8, the display device 10 according to the current embodiment may include a display panel 100 and a backlight assembly.

The display panel 100 is a panel that displays an image. The display panel 100 may be any one of a liquid crystal display (LCD) panel, an electrophoretic display panel, an organic light-emitting diode (OLED) panel, a light-emitting diode (LED) panel, an inorganic electroluminescent (EL) display panel, a field emission display (FED) panel, a surface-conduction electron-emitter (SED) panel, a plasma display panel (PDP), and a cathode ray tube (CRT) display panel. Hereinafter, a case where the display panel 100 is an LCD panel will be described as an example, but the inventive concept is not limited to this example.

The display panel 100 may include a first substrate 130 which includes a plurality of pixels, a second substrate 110 which faces the first substrate 130, and a liquid crystal layer (not shown) which is interposed between the first substrate 130 and the second substrate 110.

Although not illustrated in the drawings, a plurality of gate lines and a plurality of data lines may be formed on the first substrate 130. The gate lines and the data lines may be arranged vertically and horizontally to define a plurality of pixel regions. A thin-film transistor which is a switching element may be formed in each of the pixel regions, and a pixel electrode may be formed on each of the pixel regions. In addition, the thin-film transistor may consist of a gate electrode which is connected to a gate line, a semiconductor layer which is formed by stacking, e.g., amorphous silicon on the gate electrode, and a source electrode and a drain electrode which are formed on the semiconductor layer and are connected to a data line and a pixel electrode.

The second substrate 110 may include a color filter which consists of a plurality of sub-color filters realizing red (R), green (G) and blue (B) colors and a black matrix which divides the sub-color filters and block light that transmits through the liquid crystal layer. Although not illustrated in FIG. 1, the display panel 100 may include a driver and a flexible circuit board which are attached to the first substrate 130 or the second substrate 110. The driver may transmit various signals (such as a driving signal) needed to display an image in a display area. The flexible circuit board may transmit various signals to the driver.

The first substrate 130 and the second substrate 110 configured as described above may be bonded together to face each other by a sealant (not shown) formed around the display area. As a result, the display panel 100 may be formed. The bonding of the first substrate 130 and the second substrate 110 may be accomplished by a bonding key (not shown) formed in the first substrate 130 or the second substrate 110. Here, since the area of the first substrate 130 is larger than that of the second substrate 110, a region of the first substrate 130 which extends from the second substrate 110 may be formed as a pad area, and an end region of the flexible circuit board may be attached to the pad area.

The display device 10 may further include a first polarizer 210 and a second polarizer 230 respectively disposed on and under the display panel 100. The first polarizer 210 may include a transmission axis of a first direction to polarize light in the first direction. The second polarizer 230 may include a transmission axis of a second direction to polarize light in the second direction.

The backlight assembly is designed to provide light to the display panel 100 and may be disposed under the display panel 100. The backlight assembly may include the LGP 500, the light source assembly 600, optical sheets 400, the mold frame 300, and the bottom chassis 900.

The light source assembly 600 provides light to the display panel 100. The light source assembly 600 may include light sources 630 which emit light and a circuit board 610 on which the light sources 630 are mounted.

Referring to FIGS. 1 through 4, the light sources 630 may be mounted on the circuit board 610 and generate light in response to driving power received through the circuit board 610. Although not illustrated in the drawings, the circuit board 610 may be electrically connected to a power supply unit (not shown). Thus, the circuit board 610 may receive the driving power from the power supply unit and transmit the driving power to the light sources 630.

Each of the light sources 630 may emit light through a first side surface 630a thereof. That is, the first side surface 630a of each of the light sources 630 may be an emission surface from which light is emitted. Each of the light sources 630 may include a light source element 631 such as an LED and a support 633 which supports the light source element 631. The first side surface 630a on which the light source element 631 is placed is the emission surface. The light source element may be buried in the support 633. In this case, light is provided from a surface of the support 633. As will be described later, the first side surface 630a (i.e., the emission surface) of each of the light sources 630 faces an incident surface 500a of the LGP 500.

The circuit board 610 may be, but is not limited to, any one of a flexible printed circuit board (FPCB), a double-sided FPCB, a printed circuit board (PCB), a metal core printed circuit board (MCPCB), and a metal printed circuit board (MPCB).

The positional relationship between the light sources 630 and the circuit board 610 is illustrated in FIG. 3. Referring to FIG. 3, a distance D1 from the first side surface 630a of a light source 630 to a first end of the circuit board 610 may be equal to or smaller than a distance D2 from a second side surface 630c of the light source 630, which faces the first side surface 630a, to a second end 610b of the circuit board 610. That is, D1 and D2 may have the relationship of 'D1≤D2.'

The positional relationship between the light sources 630 and the circuit board 610 is also illustrated in FIG. 4. Referring to FIG. 4, a first centerline CD that halves a light source 630 may be located in a direction from the second side surface 630c of the light source 630 toward the first side surface 630a of the light source 630, compared with a second centerline CP that halves the circuit board 610. The first centerline CD is a straight line composed of points at equal distances B to the first side surface 630a of the light source 630 and to the second side surface 630c of the light source 630. Likewise, the second centerline CP is a straight line composed of points at equal distances A to a first end 610a of the circuit board 610 and to the second end 610b of the circuit board 610.

That is, the first centerline CD may be located closer to the first side surface 630a of the light source 630 than the second centerline CP. In addition, since the first side surface 630a of the light source 630 faces the incident surface 500a of the LGP 500 which will be described later, the first centerline CD may be located closer to the LGP 500 than the second centerline CP.

Referring back to FIGS. 1 and 2, the LGP 500 has the incident surface 500a upon which light generated by the light sources 630 is incident and an exit surface 500b which changes the direction of the incident light and then outputs the light toward the display panel 100. That is, the LGP 500 guides light received from the light sources 630 toward the display panel 100.

The LGP 500 may be made of a transparent material that refracts light. In an exemplary embodiment, the transparent material may be, but is not limited to, transparent polymer resin such as polycarbonate or polymethyl methacrylate. In addition, the LGP 500 may be formed of a rigid material. However, the material of the LGP 500 is not limited to the rigid material, and the LGP 500 may also be made of a flexible material. The LGP may be shaped like a plate. In an exemplary embodiment, the LGP 500 may be shaped like a rectangular parallelepiped plate. In the present specification, the LGP 500 shaped like a rectangular parallelepiped plate will be described, but the shape of the LGP 500 is not limited to the rectangular parallelepiped plate and can be changed appropriately if necessary.

A side of the LGP 500 at which the incident surface 500a is located may overlap the circuit board 610. That is, a portion of the side of the LGP 500 at which the incident surface 500a is located may be disposed on the circuit board 610.

The optical sheets 400 may be disposed between the LGP 500 and the display panel 100. The optical sheets 400 may control light emitted from the light sources 630 or modulate optical characteristics of the emitted light. The optical sheets 400 may include a diffusion sheet 430, a prism sheet 413 and a protective sheet 411 stacked sequentially on the LGP 500. The diffusion sheet 430 diffuses light. The prism sheet 413 focuses the light diffused by the diffusion sheet 430 in a direction perpendicular to a flat surface of the display panel 100 thereabove. Most of the light that passes through the prism sheet 413 enters the display panel 100 in a direction perpendicular to the display panel 100. The protective sheet 411 is disposed on the prism sheet 413 and protects the prism sheet 413 against external impact. In the current embodiment, the optical sheets 400 include one diffusion sheet 430, one prism sheet 413, and one protective sheet 411. However, the inventive concept is not limited thereto. At least one of the diffusion sheet 430, the prism sheet 413 and the protective sheet 411 included in the optical sheets 430 may be provided in a plurality, or any one of the diffusion sheet 430, the prism sheet 413 and the protective sheet 411 may be omitted if necessary.

Part of the optical sheets 400 may cover an upper surface 630b of each of the light sources 630. In other words, part of the optical sheets 400 may extend onto the light sources 630 to overlap the light sources 630. In FIG. 2, a portion of the protective sheet 411 covers the upper surface 630b of each of the light sources 630. However, this is merely an example, and a portion of the prism sheet 413 may also extend to cover the upper surfaces 630b of the light sources 630. Alternatively, both the protective sheet 411 and the prism sheet 413 may cover the upper surfaces 630b of the light sources 630, or a portion of the diffusion sheet 430 may extend to cover the upper surfaces 630b of the light sources 630.

Referring to FIGS. 1 through 6, the mold frame 300 may be formed as a quadrilateral frame that covers sides of the light source assembly 600 and the LGP 500. The mold frame 300 may be made of, but not limited to, a plastic material such as polycarbonate or a metal material.

The mold frame 300 may include a sidewall 310 which is shaped like a quadrilateral frame and a protrusion 330 which protrudes from the sidewall 310 toward the LGP 500 and the light source assembly 600. The protrusion 330 may include an upper surface 330a, a side surface 330c, and a lower surface 330b. Likewise, the sidewall 310 may include an upper surface 310a, a lower surface 310b, and a lower inner side surface 310c.

The display panel 100 may be placed on the protrusion 330. More specifically, the display panel 100 may be placed on the upper surface 330a of the protrusion 330. The lower surface 330b of the protrusion 330 may be located higher than the lower surface 310b of the sidewall 310. In addition, a circuit board fixing groove 350 may be formed under the protrusion 330. The circuit board fixing groove 350 may be defined by the lower surface 330b of the protrusion 330 and the lower inner side surface 310c of the sidewall 310. A portion of the circuit board 610 may be located within the circuit board fixing groove 350 and thus fixed in position by the mold frame 300. In addition, the side surface 330c of the protrusion 330 may face the second side surface 630c of each of the light sources 630.

The relationship among the mold frame 300, the light source assembly 600 and the LGP 500 is illustrated in FIGS. 2 and 7. Referring to FIGS. 2 and 7, the first end 610a of the circuit board 610 of the light source assembly 600 may be located under the LGP 500, and the second end 610b of the circuit board 610 may be located under the protrusion 330 of the mold frame 300. That is, a side of the circuit board 610 may be overlapped by the LGP 500, and the other side of the circuit board 610 may be overlapped by the mold frame 300 or the protrusion 330.

A width W1 by which the circuit board 610 is overlapped by the LGP 500 may be equal to or smaller than a width W2 by which the circuit board 610 is overlapped by the mold frame 300 or the protrusion 330. That is, W1 and W2 may have the relationship of 'W1≤W2.'

The upper surface 630b of each of the light sources 630 of the light source assembly 600 may not be overlapped by the mold frame 300 or the protrusion 330. That is, the mold frame 300 or the protrusion 330 may not be located on the light sources 630.

The circuit board 610 and the mold frame 300 may be fixed to each other by a first adhesive member 811. In an exemplary embodiment, the circuit board 610 and the lower surface 330b (i.e., an upper surface of the circuit board fixing groove 350) of the protrusion 330 may be fixed to each other by the first adhesive member 811. The first adhesive member 811 may be a double-sided adhesive tape. However, the first adhesive member 811 is not limited to the double-sided adhesive tape and may also be an adhesive.

The circuit board 610 and the LGP 500 may be fixed to each other by a second adhesive member 812. In an exemplary embodiment, the circuit board 610 and the LGP 500 may be fixed to each other by the second adhesive member 812. Like the first adhesive member 811, the second adhesive member 812 may be a double-sided adhesive tape. However, the second adhesive member 812 is not limited to the double-sided adhesive tape and may also be an adhesive.

Referring back to FIGS. 1 and 2, each of the upper surfaces 630b of the light sources 630 and a portion of the exit surface 500b of the LGP 500 which is continuous with the incident surface 500a of the LGP 500 may be covered by a light-blocking member BL1. The light-blocking member BL1 prevents light from leaking to areas other than the display area of the display panel 100. The light-blocking member BL1 may be made of, but not limited to, a light-blocking tape. One surface BL1a of the light-blocking member BL1 may be attached to a rear surface of the display panel 100, and an end of the light-blocking member BL1 may be fixed onto the protrusion 330 by a fifth adhesive member 815. In an exemplary embodiment, the fifth adhesive member 815 may be, but is not limited to, a double-sided adhesive tape.

Referring to FIGS. 1 through 8, the bottom chassis 900 houses the mold frame 300, the LGP 500, the light source assembly 600, and the optical sheets 400. The bottom chassis 900 may be bent to surround the light source assembly 600 and the mold frame 300.

The bottom chassis 900 may be made of a rigid material such as a plastic material or a metal material. In addition, the bottom chassis 900 may be made of a light-reflecting material such as aluminum (Al). Accordingly, an inner surface of the bottom chassis 900 may form a reflective surface and reflect light emitted from the light sources 630 toward the LGP 500. However, the inventive concept is not limited thereto. That is, the bottom chassis 900 itself may not be made of a light-reflecting material. In this case, the inner surface of the bottom chassis 900 may be coated with a reflective material RL1 to form a reflective surface.

The bottom chassis 900 may include a bottom portion 910 and a sidewall portion 930 extending upward from edges of the bottom portion 910.

The bottom portion 910 may include a first bottom portion 911, a second bottom portion 915, and a step portion 913 having a side continuous with the first bottom portion 911 and the other side continuous with the second bottom portion 915.

An upper surface 911a of the first bottom portion 911 may be located relatively lower than an upper surface 915a of the second bottom portion 915. An upper surface 913a of the step portion 913 may form an angle θ with the upper surface 911a of the first bottom portion 911. The angle θ may be, but is not limited to, an obtuse angle, more specifically, an angle of 90 to less than 180 degrees.

The circuit board 630 may be placed on the first bottom portion 911 and may be fixed onto the first bottom portion 911. In an exemplary embodiment, the circuit board 630 may be fixed onto the first bottom portion 911 by a third adhesive member 813. The third adhesive member 813 may be a double-sided adhesive tape. However, the third adhesive member 813 is not limited to the double-sided adhesive tape and may also be an adhesive.

The mold frame 300 may also be placed on the first bottom portion 911. In an exemplary embodiment, the mold frame 300 may be fixed onto the first bottom portion 911 by a fourth adhesive member 814. Like the third adhesive member 813, the fourth adhesive member 814 may be a double-sided adhesive tape. However, the fourth adhesive member 814 is not limited to the double-sided adhesive tape and may also be an adhesive. In the drawings, the third adhesive member 813 and the fourth adhesive member 814 are illustrated as separate components. However, this is merely an example, and the third adhesive member 813 and the fourth adhesive member 814 may be formed as a single component.

The LGP 500 may be located on the second bottom portion 915, and the second bottom portion 915 may support the LGP 500.

A light-absorbing member BL2 may be disposed between the bottom portion 910 and the LGP 500. More specifically, the light-absorbing member BL2 may cover the step portion 913 or a boundary between the step portion 913 and the second bottom portion 915. If the step portion 913 is not overlapped by the light-blocking member BL1 as illustrated in FIG. 2, light reflected at the step portion 913 or the boundary between the step portion 913 and the second bottom portion 915 may leak. Specifically, there is a possibility that the reflected light will leak through a portion P not covered by the light-blocking member BL1. On the other hand, in the display device 10 according to the current embodiment, the light-absorbing member BL2 is formed to cover the step portion 913 or the boundary between the step portion 913 and the second bottom portion 915. Accordingly, the possibility of light leakage is reduced.

In the display device 10 of the present embodiment, the circuit board 610 of the light source assembly 600 is fixed onto the bottom chassis 900. Thus, the light source assembly 600 can be prevented from moving out of its place due to the deformation of the display panel 100. In addition, the circuit board 600 of the light source assembly 600 is overlapped by the mold frame 300 and thus additionally fixed in place. Therefore, reliability can further be improved, and a width of a bezel portion can be reduced. Also, since the mold frame 300 does not cover the upper surfaces 630b of the light sources 630 of the light source assembly 600, a manufacturing process becomes easier. Furthermore, the formation of the light-absorbing member BL2 can reduce the possibility of light leakage.

Figure 9:
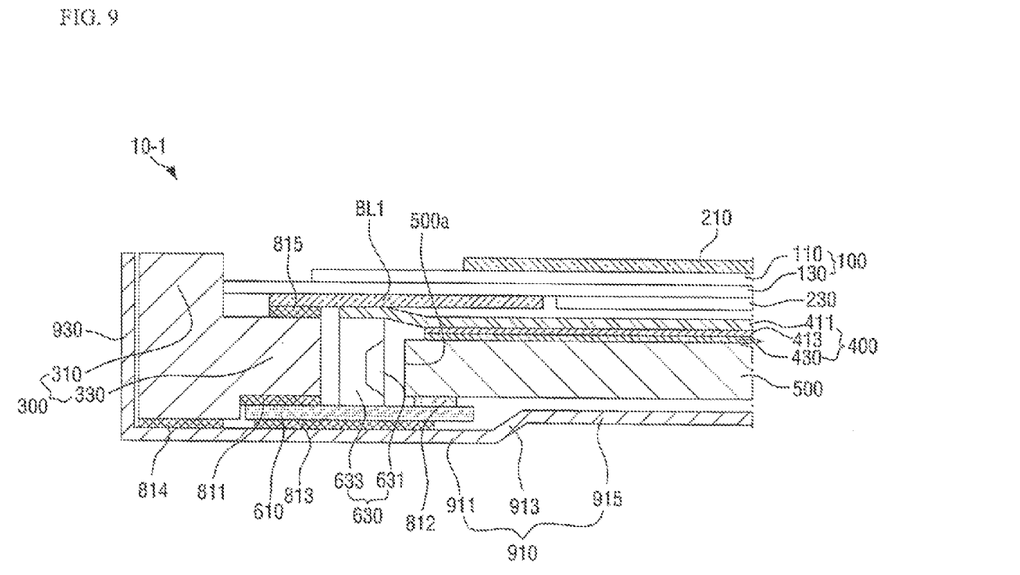
FIG. 9 illustrates a modified embodiment of the display device of FIG. 2.

FIG. 9 illustrates a modified embodiment of the display device 10 of FIG. 2.

Referring to FIG. 9, a display device 10-1 according to the current embodiment is different from the display device 10 of FIG. 2 in that a step portion 913 of a bottom chassis 900 is overlapped by a light-blocking member BL1 and that a light-absorbing member is not provided. Other elements are the same as those described above with reference to FIGS. 2 through 8, and thus a redundant description thereof will be omitted for the sake of simplicity.

In the display device 10-1 according to the current embodiment, the step portion 913 of a bottom portion 910 of the bottom chassis 900 is overlapped by the light-blocking member BL1. Accordingly, even if light is reflected at the step portion 913 or a boundary between the step portion 913 and a second bottom portion 915, the reflected light is blocked by the light-blocking member BL1. This can reduce the possibility of light leakage even without a light-absorbing member BL2.

Figure 10:
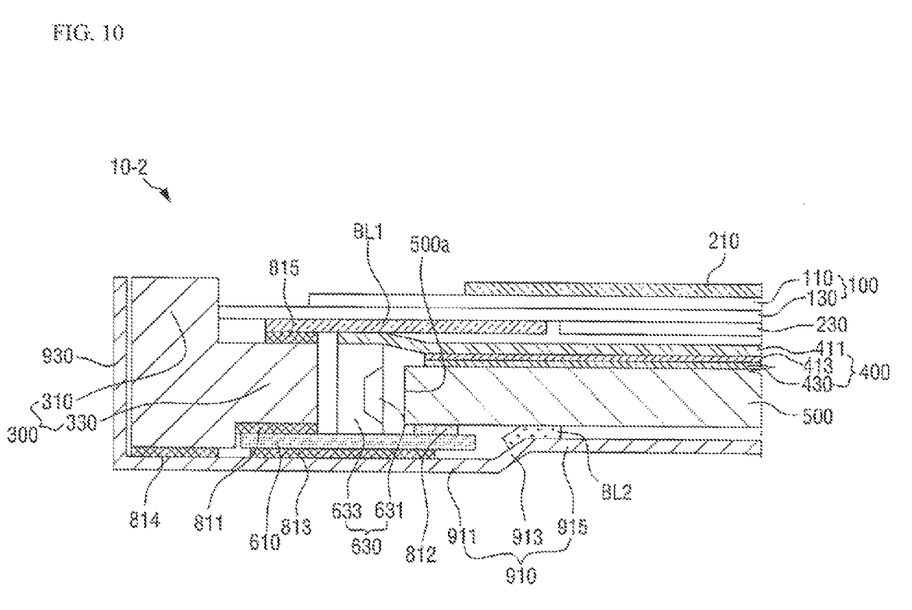
FIG. 10 illustrates another modified embodiment of the display device of FIG. 2.

FIG. 10 illustrates another modified embodiment of the display device 10 of FIG. 2.

Referring to FIG. 10, a display device 10-2 according to the current embodiment is different from the display device 10 of FIG. 2 in that a step portion 913 of a bottom chassis 900 is overlapped by a light-blocking member BL1 and is different from the display device 10-1 of FIG. 9 in that it further includes a light-absorbing member BL2. Other elements are the same as those described above with reference to FIGS. 2 through 9, and thus a redundant description thereof will be omitted for the sake of simplicity.

In the display device 10-2 according to the current embodiment, the step portion 913 of a bottom portion 910 of the bottom chassis 900 is overlapped by the light-blocking member BL1. Accordingly, even if light is reflected at the step portion 913 or a boundary between the step portion 913 and a second bottom portion 915, the reflected light is blocked by the light-blocking member BL1. In addition, the display device 10-2 according to the current embodiment may further include the light-absorbing member BL2 which covers the step portion 913 or the boundary between the step portion 913 and the second bottom portion 915. Accordingly, the possibility of light leakage can further be reduced.

Embodiments provide at least one of the following advantages.

Embodiments can provide a display device having improved reliability.

Embodiments can also provide a display device having reduced bezel width and thickness.

However, the effects are not restricted to the one set forth herein. The above and other effects will become more apparent to one of daily skill in the art to which the inventive concept pertains by referencing the claims.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation.

What is claimed is:

1. A display device comprising:
    a display panel;
    a light source assembly comprising a light source configured to generate light and a circuit board on which the light source is mounted;
    a light guide plate (LGP) comprising an incident surface upon which the light generated by the light source is incident and an exit surface configured to output the light incident through the incident surface toward the display panel;
    a mold frame comprising a sidewall and a protrusion which protrudes inward from the sidewall; and
    a bottom chassis comprising a bottom portion and a sidewall portion and housing the mold frame, the LGP and the light source assembly,
    wherein the display panel is placed on an upper surface of the protrusion, at least a portion of the circuit board is disposed between a lower surface of the protrusion and the bottom portion, and an upper surface of the light source does not overlap the protrusion, wherein the protrusion overlaps at least part of the circuit board and the sidewall does not overlap any portion of the circuit board.

2. The display device of claim 1, wherein a first centerline that halves the light source is located closer to the LGP than a second centerline that halves the circuit board.

3. The display device of claim 1, wherein a distance from a first side surface of the light source which is adjacent to the incident surface to a first end of the circuit board is equal to or smaller than a distance from a second side surface of the light source which faces the first side surface of the light source to a second end of the circuit board.

4. The display device of claim 1, wherein a circuit board fixing groove is formed under the protrusion, and at least a portion of the circuit board is located within the circuit board fixing groove.

5. The display device of claim 4, wherein an upper surface of the circuit board fixing groove and the circuit board are fixed to each other by a first adhesive member.

6. The display device of claim 1, wherein a side of the circuit board is overlapped by the protrusion, and the other side of the circuit board is overlapped by the LGP.

7. The display device of claim 6, wherein a width by which the circuit board is overlapped by the protrusion is equal to or greater than a width by which the circuit board is overlapped by the LGP.

8. The display device of claim 7, wherein the LGP is fixed onto the circuit board by a second adhesive member.

9. The display device of claim 1, wherein the circuit board is fixed onto the bottom portion by a third adhesive member.

10. The display device of claim 1, wherein a lower surface of the mold frame is fixed onto the bottom portion by a fourth adhesive member.

11. The display device of claim 1, wherein the bottom portion comprises:
    a first bottom portion located under the circuit board;
    a second bottom portion located under the LGP; and
    a step portion having a first side connected to the first bottom portion and a second side connected to the second bottom portion,
    wherein an upper surface of the first bottom portion is located lower than an upper surface of the second bottom portion.

12. The display device of claim 11, further comprising a light-absorbing member which is located between the bottom portion and the LGP and covers the second side of the step portion and a portion of the upper surface of the second bottom portion.

13. The display device of claim 11, further comprising a light-blocking member which covers the upper surface of the light source and a portion of an upper surface of the LGP which is continuous with the incident surface of the LGP, wherein the step portion is overlapped by the light-blocking member.

14. The display device of claim 13, wherein a lower surface of the light-blocking member is fixed onto the upper surface of the protrusion by a fifth adhesive member.

15. The display device of claim 1, wherein the bottom chassis comprises a reflective surface.

16. A display device comprising:
    a display panel;
    a light source assembly comprising a light source configured to generate light and a circuit board on which the light source is mounted;
    a light guide plate (LGP) comprising an incident surface upon which the light generated by the light source is incident and an exit surface configured to output the light incident through the incident surface toward the display panel;
    a mold frame on which the display panel is placed and which fixes the circuit board in place;
    a bottom chassis comprising a bottom portion and a sidewall portion and housing the mold frame, the LGP and the light source assembly; and
    a light-blocking member covering an upper surface of the light source and a portion of an upper surface of the LGP which is continuous with the incident surface,
    wherein the bottom portion comprises a step portion which is located under the LGP and overlapped by the light-blocking member.

17. The display device of claim 16, wherein the upper surface of the light source does not overlap the mold frame.

18. The display device of claim 16, wherein a first centerline that halves the light source is located closer to the LGP than a second centerline that halves the circuit board.

19. The display device of claim 16, wherein a distance from a first side surface of the light source which is adjacent to the incident surface to a first end of the circuit board is equal to or smaller than a distance from a second side surface of the light source which faces the first side surface of the light source to a second end of the circuit board.

20. The display device of claim 16, wherein a first side of the circuit board is overlapped by a protrusion of the mold frame, and a second side of the circuit board is overlapped by the LGP, wherein a width by which the first side of the circuit board is overlapped by the protrusion is equal to or greater than a width by which the second side of the circuit board is overlapped by the LGP.

* * * * *